United States Patent [19]

Gauger et al.

[11] 4,355,346
[45] Oct. 19, 1982

[54] ELECTRICAL APPARATUS HAVING AN IMPROVED DIELECTRIC SYSTEM

[75] Inventors: Gary A. Gauger, Franklin; Marco J. Mason, Racine, both of Wis.

[73] Assignee: McGraw-Edison Company, Elgin, Ill.

[21] Appl. No.: 199,260

[22] Filed: Oct. 21, 1980

Related U.S. Application Data

[63] Continuation of Ser. No. 25,043, Mar. 29, 1979, abandoned.

[51] Int. Cl.³ .............................................. H01G 4/22
[52] U.S. Cl. ................................. 361/318; 174/25 C; 361/315; 361/319; 585/6.3
[58] Field of Search ...................... 361/315, 318, 319; 585/6.3; 174/25 C; 252/578

[56] References Cited

U.S. PATENT DOCUMENTS 3,812,407  5/1974  Nose ..................................... 361/315
4,053,941 10/1977  Shimizu ............................... 361/319
4,097,912  1/1978  Lapp .................................. 361/315 X
4,119,555 10/1978  Jay .................................... 585/6.3 X

FOREIGN PATENT DOCUMENTS 5010500  6/1973  Japan ..................................... 585/6.3
50-85900  7/1975  Japan ..................................... 361/319
51-33278  9/1976  Japan ..................................... 361/315

Primary Examiner—Richard R. Kucia
Attorney, Agent, or Firm—Andrus, Sceales, Starke & Sawall

[57] ABSTRACT

An electrical apparatus, such as a capacitor, having an improved dielectric system. The capacitor includes alternate layers of metal foil and dielectric material which is impregnated with 1,1-bis(3,4-dimethylphenyl)ethane. The capacitor has improved corona characteristics and low dielectric losses. The liquid dielectric is biodegradable and environmentally acceptable.

4 Claims, 2 Drawing Figures

ELECTRICAL APPARATUS HAVING AN IMPROVED DIELECTRIC SYSTEM

This is a continuation of application Ser. No. 25,043, filed Mar. 29, 1979 now abandoned.

BACKGROUND OF THE INVENTION

In the construction of capacitors, such as power factor correction capacitors, the capacitor packs are formed of alternate layers of metal foil and a solid dielectric material such as paper or polymeric film, which is impregnated with a liquid dielectric. In the past, polychlorinated biphenyl has seen wide use as a dielectric fluid for impregnating the paper or polymeric film dielectric material. While the polychlorinated biphenyls, such as for example, trichlorodiphenyl, produce an effective dielectric system for a capacitor, their usage has provided certain ecology problems in that the polychlorinated biphenyls are virtually non-biodegradable, with the result that if leakage or rupture occurs in the capacitor casing, or if the capacitor is discarded as obsolete, the polychlorinated biphenyl will remain as a pollutant in the environment and will not degrade to any appreciable extent, even over extended periods of years.

As a consequence of the pollution problem presented by the polychlorinated biphenyls, a number of dielectric liquids have more recently been used as replacements for polychlorinated biphenyls, including such materials as isopropyl biphenyl, phthalate ester/trichlorobenzene, and buylated monochlorodiphenyl oxide.

Of these fluids, the phthalate ester/trichlorobenzene mixture has come under question because of its environmental acceptability. Trichlorobenzene, for example, has been shown to form, in the presence of sunlight, polychlorinated biphenyl, and thus there is an implication that the exposure of this compound to the environment may generate the undesirable polychlorinated biphenyls.

Isopropyl biphenyl performs satisfactorily from an electrical standpoint, but the flammability properties are below that of the polychlorinated biphenyls, being only equivalent to regular transformer oil in its flash and fire properties.

SUMMARY OF THE INVENTION

The invention relates to an electrical apparatus, such as a capacitor, having an improved dielectric system. In accordance with the invention, the solid dielectric material which can be paper, polymeric film, or a combination of paper and polymeric film, is impregnated with a liquid 1,1-bis(3,4-dimethylphenyl)ethane. The capacitor of the invention exhibits low dielectric losses and has improved corona characteristics compared to conventional dielectric fluids. The increase in corona characteristics allows the capacitor to operate at higher electrical stresses and this, in turn, permits a more compact capacitor design which results in lower material costs per capacitor.

As a further advantage, the dielectric liquid is substantially completely biodegradable, with the result that the compound will decompose if exposed to the atmosphere through leakage or rupture of the casing and thus, there will be no adverse effects on the environment.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
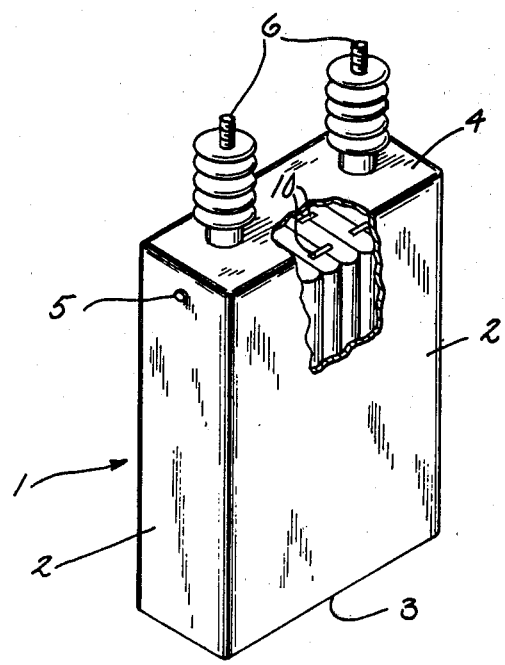
FIG. 1 is a perspective view of a typical capacitor constructed in accordance with the invention.

FIG. 1 illustrates a typical capacitor comprising an outer casing 1 having side walls 2, bottom wall 3 and a cover 4. In service, the casing 1 is hermetically sealed and is provided with a small seal hole 5, through which the dielectric liquid is introduced into the casing during fabrication. In addition, a vacuum line can be connected to hole 5 for vacuum drying of the capacitor during fabrication. A pair of terminals 6 project through the cover and are insulated from the cover.

Figure 2:
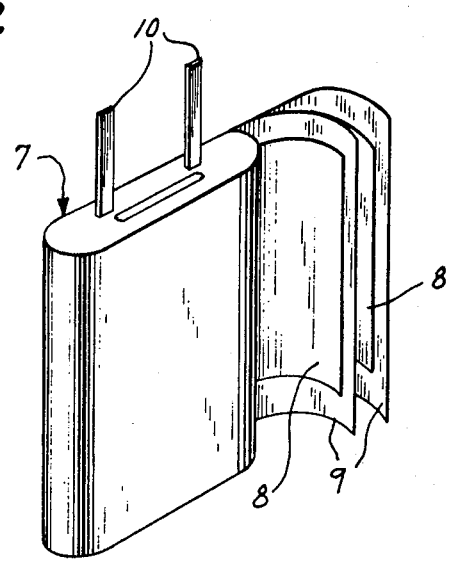
FIG. 2 is a perspective view of a capacitor pack.

A series of capacitor packs 7 are disposed within the casing 1 and each capacitor pack, as illustrated in FIG. 2, includes wound layers of metal foil 8 separated by a dielectric layer 9. Electrodes 10 are connected to the foil layers 8, and the electrodes of the various packs are connected together in series for final connection to the terminals 6.

The foil layers 8 may be formed of any electrical conductive material, generally a metallic material, such as aluminum, copper, or the like. The layers 8 may be in the form of flat sheets, or the layers can be provided with surface irregularities, such as a series of deformations formed by indentations on one side of the foil and corresponding elevations on the other side, as disclosed in U.S. Pat. No. 3,746,953.

The dielectric layers 9 can be composed of paper, such as Kraft paper, or polymeric film, such as polypropylene, polyethylene, polyester, polycarbonate, or the like. The dielectric layers 9 can be in the form of smooth surface sheets, or in the case of polymeric film, the layers can be formed of polyolefin film, such as polypropylene, having a layer of fine polyolefin fibers adhering to the surface, as disclosed in U.S. Pat. No. 3,772,579.

It is preferred that the surface of the polymeric film 9 and/or the contiguous surface of the metal foil 8, have surface irregularities or deformations, so that the two contiguous surfaces are not in continuous intimate contact. The surface irregularities provide a wicking or capillary effect for the liquid dielectric enabling the liquid to thoroughly impregnate the film 9 during processing.

In accordance with the invention, the dielectric layers 9 are impregnated with 1,1-bis(3,4-dimethylphenyl)ethane which has the following structural formula:

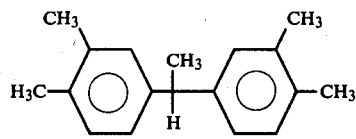

The dielectric liquid, 1,1-bis(3,4-dimethylphenyl)ethane has a flash point of 170° C., a fire point of 188° C., a pour point of −20° C., a viscosity at 40° C. of 10.43 centistokes, and a viscosity at 100° C. of 2.43 centistokes.

1,1-bis(3,4-dimethylphenyl)ethane is commercially available and sold under the trade designation "DXE" by the Gulf Oil Company.

The dielectric liquid can also include from 0.01 to 10.0% by weight and preferably from about 0.2% to 1.5% by weight of an epoxide scavenger which will act to neutralize decomposition products that are generated from the liquid impregnant and other materials in the capacitor during its operation. The neutralizing agents or scavengers can take the form of 1,2,-epoxy-3-phenoxypropane, bis(3,4-epoxy-6-methylcyclohexylmethyl) adiptate; 1-epoxyethyl-3,4-epoxycyclohexane; 3,4-epoxycyclohexylmethyl-3,4-epoxycyclohexanecarboxylate; 3,4-epoxy-6-methylcyclohexylmethyl-3,4-epoxy-6-methylcyclohexanecarboxylate; and mixtures thereof. The epoxide compounds are effective to rapidly neutralize decomposition products, thereby improving the dielectric properties and service life of the capacitor.

The capacitor of the invention can be processed by the method set forth in the copending U.S. Patent application Ser. No. 801,637, filed May 31, 1977. In general, the processing consists of subjecting the interior of the casing containing the capacitor packs to a vacuum for a period of time sufficient to remove water vapor and other gases from the interior of the casing. A vacuum less than 100 microns, and preferably below 30 microns, is normally employed for a period longer than 40 hours.

The liquid dielectric is separately subjected to vacuum to remove gases, and a vacuum less than 500 microns is utilized with a vacuum less than 50 microns being preferred. To accelerate the degassing it is preferred to agitate the liquid, by circulating the liquid or subjecting it to stirring or mixing action. In general, the liquid is subjected to the vacuum drying treatment for a period in excess of 12 hours. The liquid is preferably maintained at room temperature, or at a temperature below 60° C., during degassing and when introduced into the capacitor casing.

After the degassed liquid is introduced into the capacitor casing, a positive pressure, generally in the range of 1 to 5 psig, is applied to the liquid dielectric to aid in impregnation of the solid dielectric layers and to bulge the casing so that subsequently, after sealing and exposure to lower temperatures, the shrinkage in volume of the dielectric liquid will not produce a negative pressure in the casing. The casing is then sealed.

As an example of the processing of the capacitor of the invention, six miniature capacitors were constructed, each having a dielectric layer composed of two sheets of polypropylene film with a total thickness of 1 mil and aluminum foil having a thickness of 0.285 mil. The capacitor casings were degassed by subjecting the casings to a vacuum of less than 100 microns for a period of about 120 hours. The liquid dielectric 1,1-bis(3,4-dimethylphenyl)ethane was separately degassed by stirring the liquid and subjecting it to a vacuum of approximately 50 microns for a period of 48 hours. The degassed liquid was then introduced into the casing and maintained under a vacuum of less than 100 microns for a period of 96 hours to impregnate the polypropylene film with the liquid.

After the impregnation period the capacitor casings were sealed.

The capacitor samples were tested at room temperature to determine the electric losses and the samples show an average loss of 0.023% at an operating voltage of 2400 volts per mil after 1000 hours.

The average discharge inception voltage (DIV) at room temperature of the sample capacitors was determined to be 3.87 Kv/mil, while the average DEV was determined to be 2.79 Kv/mil. Both the DIV and DEV were approximately 25% higher than capacitors utilizing polychlorinated biphenyl as the dielectric liquid.

The capacitor using 1,1-bis(3,4-dimethylphenyl)ethane as the dielectric liquid exhibits low dielectric losses and has a higher DIV and DEV than conventional dielectric liquids, thereby providing good corona characteristics and resulting in an increased safety margin insuring that the electrical stress will be well below the DIV, or alternately, permitting an increase in the electrical stress without a decrease in the safety margin.

The liquid dielectric is substantially fully biodegradable, meaning that if the liquid dielectric should be exposed to the environment, because of leakage or rupture of the casing or through discarding of obsolete capacitors, the liquid dielectric will readily decompose into harmless components and there will be no significant adverse environmental effect.

While the dielectric liquid has a burn point it will not burn as readily as other conventional dielectrics, such as mineral oil and vegetable oils and isopropyl biphenyl, all of which have seen use as dielectric liquids.

While the above description has shown the dielectric system as used in an electrical capacitor, it is contemplated that the dielectric system can also be utilized in other electrical apparatus, such as switch gears, transformers, and the like.

Various modes of carrying out the invention are contemplated as being within the scope of the following claims particularly pointing out and distinctly claiming the subject matter which is regarded as the invention.

We claim:

1. An electrical capacitor, comprising a sealed casing and having alternate layers of an electrically conductive material and a dielectric material disposed within the casing, and a dielectric liquid impregnated into said dielectric material, said dielectric liquid consisting essentially of 1,1-bis(3,4-dimethylphenyl)ethane.

2. The capacitor of claim 1, wherein one of said materials is provided with surface irregularities so that said materials are in non-contiguous contact.

3. The capacitor of claim 1, wherein said dielectric material is polypropylene.

4. The capacitor of claim 1, wherein said liquid dielectric includes from 0.01% to 10.0% by weight of an epoxide compound selected from the group consisting of 1,2-epoxy-3-phenoxypropane, bis (3,4-epoxy-6-methylcyclohexylmethyl) adipate; 1-epoxyethyl-3,4,-epoxycyclohexane; 3,4-epoxycyclohexylmethyl-3,4-epoxycyclohexanecarboxylate; 3,4-epoxy-6-methylcyclohexylmethyl-3,4-epoxy-6-methylcyclohexanecarboxylate; and mixtures thereof.

* * * * *